US007865190B2

(12) United States Patent
Cave

(10) Patent No.: US 7,865,190 B2
(45) Date of Patent: *Jan. 4, 2011

(54) SIGNALING CONNECTION ADMISSION CONTROL IN A WIRELESS NETWORK

(75) Inventor: Christopher R. Cave, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/551,672

(22) Filed: Sep. 1, 2009

(65) Prior Publication Data

US 2009/0318159 A1    Dec. 24, 2009

Related U.S. Application Data

(63) Continuation of application No. 11/974,380, filed on Oct. 12, 2007, now Pat. No. 7,583,970, which is a continuation of application No. 11/471,454, filed on Jun. 19, 2006, now Pat. No. 7,283,825, which is a continuation of application No. 11/042,410, filed on Jan. 25, 2005, now Pat. No. 7,065,366, which is a continuation of application No. 10/640,291, filed on Aug. 13, 2003, now Pat. No. 6,868,273, which is a continuation of application No. 10/264,775, filed on Oct. 4, 2002, now Pat. No. 6,631,269.

(60) Provisional application No. 60/382,811, filed on May 23, 2002.

(51) Int. Cl.
*H04W 72/00* (2009.01)

(52) U.S. Cl. ................ 455/450; 455/453; 455/509; 370/329; 370/333

(58) Field of Classification Search ......... 455/450–453, 455/50–510, 515; 370/329, 347–349, 522, 370/524, 437, 335, 342, 352
See application file for complete search history.

(56) References Cited

U.S. PATENT DOCUMENTS 5,408,682 A    4/1995    Ranner et al.
5,430,760 A    7/1995    Dent (Continued)

FOREIGN PATENT DOCUMENTS

CA          2 330 881       7/2001

(Continued)

*Primary Examiner*—Kamran Afshar
(74) *Attorney, Agent, or Firm*—Volpe and Koenig, P.C.

(57) ABSTRACT

A method for admission control of control plane signaling requests includes receiving a signaling request. Upon receipt of the signaling connection request, a first determination is performed to determine whether to provide admission to common resources. When the first determination is negative, a second determination is performed to determine whether to provide admission to dedicated resources. When the second determination is negative, the signaling request is rejected. When the second determination is positive, the request is admitted to dedicated resources. When the first determination is positive, a third determination is performed to determine whether the quality of the signaling request is high or low. If the quality of the request is high, the signaling request is admitted to common resources. When the quality is low, a fourth determination is performed to determine whether to provide admission to dedicated resources. If the fourth determination is positive, the request is admitted to dedicated resources. If the fourth determination is negative, the request is admitted to common resources.

9 Claims, 2 Drawing Sheets

U.S. PATENT DOCUMENTS

| | | | |
|---|---|---|---|
| 5,570,355 | A | 10/1996 | Dail et al. |
| 5,742,588 | A * | 4/1998 | Thornberg et al. ........... 370/329 |
| 5,802,465 | A | 9/1998 | Hamalainen et al. |
| 5,884,171 | A | 3/1999 | Tanabe et al. |
| 5,886,988 | A | 3/1999 | Yun et al. |
| 6,167,248 | A | 12/2000 | Hamalainen et al. |
| 6,222,824 | B1 | 4/2001 | Marin et al. |
| 6,266,322 | B1 | 7/2001 | Berger et al. |
| 6,301,252 | B1 | 10/2001 | Rangachar |
| 6,396,837 | B1 | 5/2002 | Wang et al. |
| 6,483,826 | B1 | 11/2002 | Ankerberg |
| 6,490,249 | B1 * | 12/2002 | Aboul-Magd et al. ........ 370/232 |
| 6,507,570 | B1 | 1/2003 | Holma et al. |
| 6,539,237 | B1 | 3/2003 | Sayers et al. |
| 6,631,269 | B1 | 10/2003 | Cave |
| 6,711,129 | B1 | 3/2004 | Bauer et al. |
| 6,775,542 | B1 | 8/2004 | Vilander et al. |
| 6,778,812 | B1 | 8/2004 | Zhang |
| 6,778,835 | B2 | 8/2004 | You et al. |
| 6,801,515 | B1 | 10/2004 | Ishikawa et al. |
| 6,868,273 | B2 | 3/2005 | Cave |
| 6,947,750 | B2 | 9/2005 | Kakani et al. |
| 7,065,366 | B2 * | 6/2006 | Cave ........................ 455/450 |
| 7,218,619 | B2 | 5/2007 | Koo et al. |
| 7,283,825 | B2 | 10/2007 | Cave |
| 7,453,847 | B2 * | 11/2008 | Wallentin et al. ........... 370/329 |
| 7,583,970 | B2 * | 9/2009 | Cave ........................ 455/450 |
| 2001/0043561 | A1 | 11/2001 | Burns et al. |
| 2001/0053140 | A1 | 12/2001 | Choi et al. |
| 2001/0053145 | A1 | 12/2001 | Willars et al. |
| 2002/0094816 | A1 | 7/2002 | Boudjema et al. |
| 2002/0094833 | A1 | 7/2002 | Lieshout et al. |
| 2002/0110106 | A1 | 8/2002 | Koo et al. |
| 2002/0119784 | A1 | 8/2002 | Agin |
| 2002/0119796 | A1 | 8/2002 | Vanghi |
| 2002/0176360 | A1 * | 11/2002 | Racz et al. .................. 370/230 |
| 2002/0181394 | A1 | 12/2002 | Partain et al. |
| 2002/0196803 | A1 | 12/2002 | Ota |
| 2003/0012217 | A1 | 1/2003 | Andersson et al. |
| 2004/0053597 | A1 | 3/2004 | Agin |
| 2004/0097191 | A1 | 5/2004 | Meyer et al. |
| 2004/0110521 | A1 | 6/2004 | Soldani et al. |
| 2004/0136342 | A1 | 7/2004 | Pedersen et al. |
| 2004/0162081 | A1 | 8/2004 | Lu |
| 2004/0203807 | A1 | 10/2004 | Bl et al. |
| 2004/0213153 | A1 | 10/2004 | Nagato et al. |
| 2004/0218578 | A1 | 11/2004 | Fisher |

FOREIGN PATENT DOCUMENTS

| | | |
|---|---|---|
| EP | 0 565 507 | 10/1993 |
| EP | 1 079 650 | 2/2001 |
| JP | S62-213340 | 9/1987 |
| JP | H03-270432 | 12/1991 |
| JP | H08-213990 | 8/1996 |
| JP | H08-336177 | 12/1996 |
| JP | H11-205352 | 7/1999 |
| JP | 2001-016215 | 1/2001 |
| JP | 2001-044914 | 2/2001 |
| TW | 382167 | 2/2000 |
| WO | 98/30057 | 7/1998 |
| WO | 00/01186 | 1/2000 |
| WO | 00/35235 | 6/2000 |
| WO | 00/57663 | 9/2000 |
| WO | 01/05050 | 1/2001 |
| WO | 02/65796 | 8/2002 |
| WO | 02/093838 | 11/2002 |

* cited by examiner

SIGNALING CONNECTION ADMISSION CONTROL IN A WIRELESS NETWORK

CROSS REFERENCES TO RELATED APPLICATION

This application is a continuation of U.S. patent application Ser. No. 11/974,380, filed Oct. 12, 2007, now U.S. Pat. No. 7,583,970, which is a continuation of U.S. patent application Ser. No. 11/471,454, filed on Jun. 19, 2006, now U.S. Pat. No. 7,283,825, which is a continuation of U.S. patent application Ser. No. 11/042,410 filed Jan. 25, 2005, now U.S. Pat. No. 7,065,366, which is a continuation of U.S. patent application Ser. No. 10/640,291, filed on Aug. 13, 2003, now U.S. Pat. No. 6,868,273, which is a continuation of U.S. patent application Ser. No. 10/264,775, filed on Oct. 4, 2002, which is now U.S. Pat. No. 6,631,269, which claims benefit of U.S. Provisional Application No. 60/382,811, filed on May 23, 2002, which are incorporated by reference as if fully set forth herein.

BACKGROUND OF THE INVENTION

The present invention relates to a wireless network where User Equipment (UE) communicates with a radio access network (RAN).

A control plane may be used for all control signaling between the UE and the RAN. A user plane may be used to transmit and receive all user information. Common resources and dedicated resources are defined in a cell for the uplink and the downlink transmission between UEs and the RAN. For example, a Random Access Channel (RACH) and a Forward Access Channel (FACH) could represent common transport channels for the uplink and the downlink, respectively. The RACH is a contention-based uplink transport channel, where a dynamic persistence level parameter controls the rate at which a UE accesses the RACH.

A UE is said to be in IDLE mode when no connection to the RAN exists, for example, following a power-up of a UE. When a signaling connection is established, i.e. control plane connection, a UE is said to be in CONNECTED mode. Once in connected mode, both control plane signaling and user plane information can be exchanged between the UE and the RAN.

An idle mode UE requests a control plane signaling connection by transmitting a CONNECTION REQUEST message over a common channel, such as the RACH. An establishment cause may be included in the connection request message to inform the RAN of the reason why the UE is requesting the connection. The RAN can admit or reject the UE's request for a signaling connection. In the former case, the UE can be admitted for signaling over common resources (CELL_FACH state) or signaling over dedicated resources (CELL_DCH state). A Call Admission Control (CAC) algorithm may be used to evaluate the allocation of dedicated resources for the uplink and/or downlink transmission between a UE and the RAN.

There is currently, however, no available methods for determining whether a UE should be admitted for a control plane signaling connection and, if admitted, should the UE be admitted for signaling over common resources or dedicated resources. Some current systems simply always admit UEs to common resources regardless of the common resources' level of congestion, thereby arbitrarily increasing congestion and often causing the UE to experience significant delay in the exchange of signaling information.

A method is therefore needed to determine whether a UE should be admitted for control plane signaling and, if admitted, whether the UE should be admitted for signaling over common resources or dedicated resources.

SUMMARY

The invention is a method for admission control of control plane signaling connection requests. The admission control method determines whether to accept or reject a UE for a control plane signaling connection. In the former case, the method determines whether the UE will be admitted for signaling over common resources or dedicated resources. In the latter case, the UE is denied access to the network and remains in its idle state.

DETAILED DESCRIPTION OF THE PREFERRED EMBODIMENTS

Figure 1:
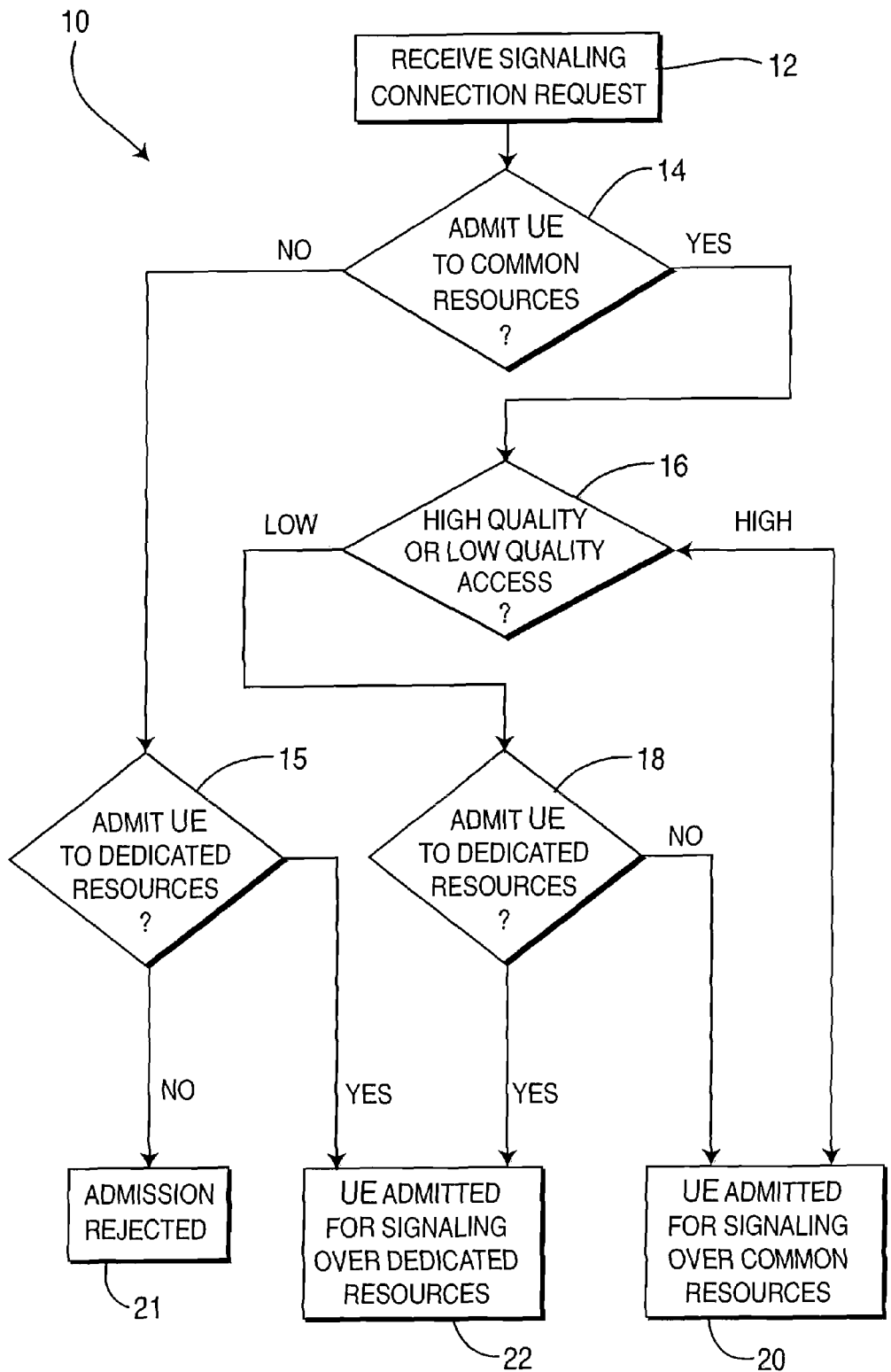
FIG. 1 is a method for admission control of control-plane signaling connection requests in accordance with the preferred embodiment of the invention.

A flow diagram of the method of the present invention is shown in FIG. 1 and indicated generally with the numeral 10. The method 10 is for controlling control plane signaling connection admission in a wireless network. The method 10 begins when the RAN receives a control plane signaling connection request from an idle UE (step 12). Admission of the signaling connection request is first evaluated for whether the connection should be admitted to common resources (step 14).

Admission to common resources is evaluated based on the predicted condition of uplink and downlink common resources; in terms of the RACH, (or any equivalent uplink common channel), and the FACH, (or similarly any equivalent downlink common channel). The admission to common resources may also be evaluated based on the establishment cause, if available, included in the signaling connection request message. For each possible establishment cause, different conditions of RACH and FACH are defined for admission to common resources.

To evaluate the admission of a signaling connection over common resources (step 14), the method 10 predicts the congestion/performance of common resources for the admitted UE and all other UEs within the cell that are transmitting over common resources. If the predicted conditions fall below predetermined maximum values, the signaling connection request is admitted to common resources. If not, the signaling connection request can be evaluated for admission to dedicated resources in step 15. An admission for a signaling connection over common resources implies that a UE will be in a CELL_FACH state following a connection setup, whereas a UE admitted to dedicated resources pursuant to a low quality signaling connection will be in a CELL_DCH state following a connection setup.

Where admission to common resources has been denied in step 14, the admission to dedicated resources is evaluated (step 15) by invoking the Call Admission Control (CAC) method within the RAN. The CAC evaluates the possibility of allocating dedicated resources for the exchange of information between the RAN and a UE. When the CAC receives a request for resources, it replies by either allocating the requested resources or rejecting the request. If the CAC allocates dedicated resources, the UE is admitted for a signaling connection with the allocated dedicated resources (step 22). Otherwise, the UE is rejected for a signaling connection (step 21).

In a preferred embodiment, the evaluation of admission to dedicated resources (step 15) can be establishment cause specific, if the establishment cause is included in the connection request message. For example, for a low priority establishment cause, the admission to dedicated resources could be rejected without having invoked the CAC. That is, connection requests that have already been rejected for admission to common resources in step 14 and have low priority establishment causes, may be automatically denied admission to dedicated resources and thereby rejected.

Where admission to common resources has been granted in step 14, the access to common resources is characterized as either high quality or low quality in step 16. The characterization may be based on factors such as delay, interference transmission error rate, congestion, throughput or any other factor allowing the classification of high quality or low quality.

The threshold or criteria for classifying the access of a UE as high quality or low quality may vary as a function of the establishment cause. Preferably, a lookup table of thresholds for different establishment causes are defined. For certain establishment causes, the criteria for classifying the access of a UE as high quality should be very broad such that signaling requests containing these establishment causes are always classified as high quality thereby ensuring that dedicated resources will never be requested. Alternatively, for other establishment causes, such as the establishment cause that corresponds to an emergency call, the criteria for classifying the access of a UE as high quality should be very narrow such that signaling requests containing these establishment causes are always classified as low quality, thereby ensuring that they will be evaluated for admission to dedicated resources.

In the high quality case, the UE is immediately admitted for a signaling connection over common resources (step 20). In the low quality case, however, an analysis (step 18) of whether the UE can be admitted to dedicated resources is performed. The analysis (step 18) is performed because although the relevant factors for admission to common resources are considered acceptable, they are nevertheless sub-optimal making it likely that the UE will experience transmission errors or significant access delays. As a result, the admission for signaling connection over dedicated resources is evaluated in step 18.

The evaluation of whether a low quality signaling connection request will be admitted to dedicated resources (step 18) is carried out in the same manner as in step 15, as described above. In the event the UE is not admitted to dedicated resources (step 22), however, it will be admitted for a signaling connection over common resources (step 20).

Figure 2:
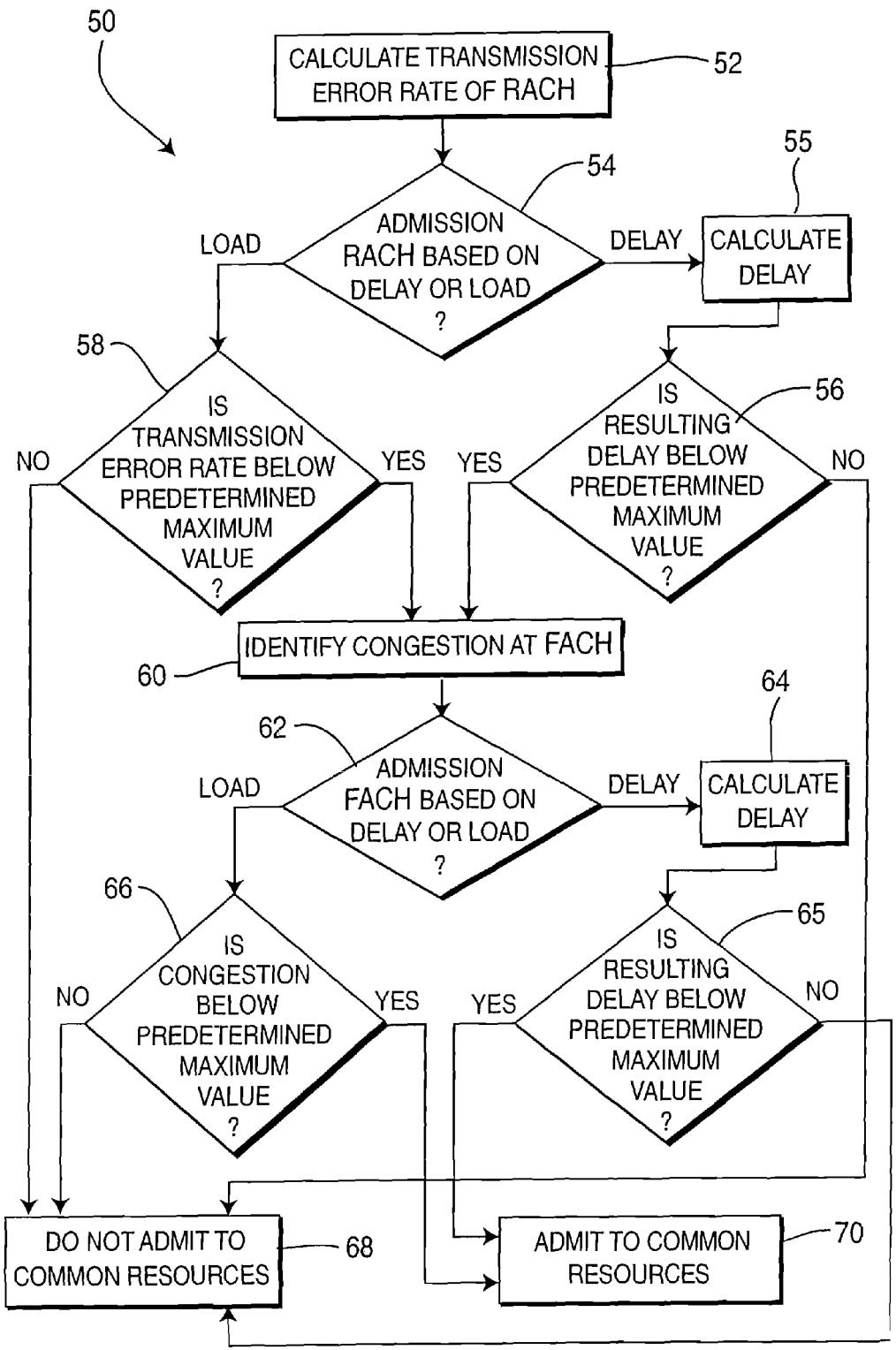
FIG. 2 is a method for evaluating whether a signaling connection will be admitted to common resources in accordance with the preferred embodiment of the invention.

As mentioned in connection with FIG. 1, step 14 involves an evaluation of whether a UE will be admitted to common resources. A preferred method 50 of evaluating whether a signal connection request will be admitted to common resources is shown in FIG. 2 and indicated generally with numeral 50, where the common resources comprise both the FACH (downlink) and the RACH (uplink), which is a contention-based uplink transport channel.

When evaluating the effect of admission to common resources in terms of the RACH, the method 50 evaluates transmission error rates and (optionally) the corresponding delay in successful RACH access. The first step 52 is to calculate the transmission error rate for accessing the RACH. The transmission error rate for accessing the RACH is observed during frames preceding the connection request and may be calculated using information available at the RAN.

First, the RACH transmission rate and the RACH transmission success rate are calculated by compiling the following information:

A history of successful RACH transmissions observed over N frames, where N typically lies in the range of 100.

A history of failed RACH transmissions observed over N frames, where N typically lies in the range of 100.

Accordingly, the following information is all or partially available at the RAN:

The establishment cause (IE) in the RRC CONNECTION REQUEST MESSAGE

The rate of successful RACH transmissions, observed over N frames preceding the connection request where N typically lies in the range of 100.

The rate of failed RACH transmissions, observed over N frames preceding the connection request where N typically lies in the range of 100.

The dynamic persistence level (DP) parameter which controls the rate at which UEs access the RACH, if managed at RNC.

The number of RACH accesses attempted by the admitted UE can be predicted using the establishment cause in the RRC CONNECTION REQUEST message. For instance, a UE would use RACH for RAB setup in the case of "Originating Conversational Call" which would typically result in 5 RACH accesses and 5 FACH accesses in a handshake manner. From the estimated number of RACH accesses attempted by the admitted UE, (i.e. the expected RACH traffic), an estimate in number of successful and failed RACH accesses and the corresponding transmission error rate within the cell is obtained from basic mathematics/simulations related to the RACH access mechanism or system monitoring.

Following step 52, (i.e. once the RACH transmission error rate is known), there are two possibilities for evaluating if the RACH quality is sufficient to admit a UE (step 54). The admission may be based on the predicted delay or the admission may be based on the predicted increase in RACH load. In the former case the delay is calculated based on the transmission error rate, whereas in the latter case the transmission error rate itself is evaluated. Whether admission of a UE is based on delay or load, is dependent on the establishment cause. For example, delay sensitive connections, such as an originating conversational call, should be admitted based on delay. Other types of requests can be accepted solely on the expected increase in RACH load.

For signaling requests having establishment causes that require RACH admission to be based on delay, the method proceeds to step 55. In step 55, the resulting delay in accessing the RACH may be calculated using the transmission error rate calculated at step 52. The value of the delay is evaluated in step 56 to determine whether it is below a predetermined maximum value. If, on the other hand, the admission is based on load (i.e. the delay is not calculated), the transmission error rate itself is evaluated in step 58 to determine whether it is below a predetermined maximum value. If either of those values (delay or transmission error rate) is below their respective predetermined maximum value, the conditions at the RACH are considered acceptable for admission to common resources.

A margin is preferably subtracted from a maximum-allowed-value to get the predetermined maximum value. The margin takes into consideration UEs transmitting/receiving over common resources from neighboring cells that might re-select the current cell, a procedure that is assumed to be uncontrollable or at least difficult to control with the UTRAN. In the cases where the idle and connected mode common resources are the same, (i.e. where idle mode and connected mode UEs transmit and receive using the same common resources), the method should also consider the transmission of other RRC connection messages in the margin. Note that the predetermined maximum values may vary according to the establishment cause that is transmitted in the RRC CONNECTION REQUEST message.

Once the effect of admitting a signaling connection request to common resources has been evaluated in terms of the RACH, it must also be evaluated in terms of the FACH. The factor impacting on common resources in terms of the FACH is the amount of congestion at the FACH. In step 60, the congestion at the FACH is identified. The amount of FACH congestion is known at the RAN by the FACH scheduler and the FACH buffer which includes the number of FACH messages waiting to be transmitted. The level of FACH congestion is a function of the number of FACH resources, the FACH scheduler design and implementation and the UTRAN architecture.

Similar to the evaluation of the RACH, following step 60, (i.e. once the FACH congestion is identified), there are two possibilities for evaluating whether to admit a UE based on the identified level of congestion (step 62). The admission may be based on the predicted delay that will result of the identified congestion or the admission may be based on the predicted increase in FACH load, i.e. the congestion itself. The selection of which method is again dependent on the establishment cause.

For establishment causes that require the evaluation of FACH congestion to be based on delay, the method proceeds to step 64. In step 64, the resulting delay in accessing the FACH may be calculated using the amount of congestion identified at step 60. The value of the resulting delay is evaluated in step 65 to determine whether it is below a predetermined maximum value. If, on the other hand, the admission is based on load (i.e. the delay is not calculated), the congestion itself is evaluated in step 66 to determine whether it is below a predetermined maximum value. If either of those values (delay or congestion) is below their respective predetermined maximum value, the conditions at the FACH are considered acceptable for admission to common resources and the signaling connection is admitted to common resources (step 70). As with the evaluation of the RACH, a margin is preferably subtracted from a maximum allowed value to get the predetermined maximum value.

As can be seen in FIG. 2, if the transmission error rate (step 52) or the delay caused thereby (step 55) at the RACH are above the predetermined maximum value, the signaling connection request will not be admitted to common resources (step 68). Similarly, if the congestion (step 60) or the delay caused thereby (step 64) at the FACH are above the predetermined maximum value, the signaling connection request will not be admitted to common resources (step 68).

As with the criteria for determining high quality and low quality access in step 16 of FIG. 1, the predetermined maximum value for the parameters at both the RACH and the FACH may vary as a function of the establishment cause. Therefore, the establishment cause may be used to ensure that signaling connection requests having certain establishment causes are admitted to common resources regardless of the conditions at the RACH and the FACH. By way of example, for high priority establishment causes such as emergency calls, the predetermined maximum value can be very high so that all requests are admitted regardless of error rates, congestion or the resulting delays caused thereby.

If admission to common resources is denied in FIG. 2, the method shown in FIG. 1 will move from step 14 to step 15 to determine whether the request may be admitted to dedicated resources and continue as described above. Similarly, if admission to common resources is accepted in FIG. 2, the method shown in FIG. 1 will move from step 14 to step 16 and continue as described above.

Although the present invention has been described in detail, it is to be understood that the invention is not limited thereto, and that various changes can be made therein without departing from the spirit and scope of the invention, which is defined by the attached claims.

What is claimed is:

1. A method for admission control of control plane signaling connection requests, comprising:
   determining admission of a user equipment (UE) to common resources on a condition of receiving a signaling connection request;
   determining admission of the UE to dedicated resources on a condition of a predetermined event; and
   allocating at least one of the common resources or the dedicated resources to the UE based on predicted conditions, wherein the predicted conditions for common resources determination include prediction of channel quality conditions relating to uplink and downlink common resources.

2. The method of claim 1, wherein a positive common resources admission determination further comprises:
   determining a signal quality access of the signaling connection request.

3. The method of claim 2, further comprising allocating common resources to the UE on a condition of a high quality access determination.

4. The method of claim 2, wherein a low quality access determination is the predetermined event.

5. The method of claim 4, further comprising allocating dedicated resources to the UE on a condition of a positive dedicated resources determination.

6. The method of claim 4, further comprising allocating common resources to the UE on a condition of a negative dedicated resources determination.

7. The method of claim 1, wherein a negative common resources determination is the predetermined event.

8. The method of claim 7, further comprising allocating dedicated resources to the UE on a condition of a positive dedicated resources determination.

9. The method of claim 7, further comprising allocating common resources to the UE on a condition of a negative dedicated resources determination.

* * * * *